Patented Dec. 20, 1949

2,491,935

UNITED STATES PATENT OFFICE 2,491,935

POLYAMIDE COMPOSITIONS

Russell H. Schlattman, Richmond Heights, Mo., assignor to Monsanto Chemical Company, St. Louis, Mo., a corporation of Delaware No Drawing. Application June 5, 1948, Serial No. 31,401

5 Claims. (Cl. 260—30.8)

This invention relates to compositions comprising synthetic linear polyamides, and more particularly, this invention relates to compositions comprising ortho-sulfobenzimide and certain synthetic linear copolymers formed by the copolymerization of complementary amide-forming components.

The simple or two component polyamides formed by the polymerization of a single diamine and a single dicarboxylic acid have high melting and softening points and are well known as being excellent materials for the formation of synthetic fibers. However, these simple polyamides are generally not formed into films and sheets because their high melting points, micro-crystalline structure and general insolubility in most solvents make the formation of sheets and films of simple polyamides difficult. Moreover, for the most part, sheets and films of plasticized simple polyamides cannot be prepared as most of the materials which are known to have plasticizing action when incorporated with other plasticizable resins such as cellulose esters, polyvinyl chloride and other polymerized vinyl resins are incompatible with the simple polyamides. On the other hand, the four or more component polyamides, such as are described in U. S. Patent No. 2,252,554, have much lower softening and melting points and otherwise more nearly resemble plasticizable resins than do the simple or two component polyamides and, therefore, possess the potentialities of being very desirable for the purpose of forming sheets and films of polyamide compositions of satisfactory clarity and flexibility. Likewise, the three component polyamides, such as are described in U. S. Patents Nos. 2,252,555 and 2,285,009, by reason of their lower softening points and melting points and less pronounced crystallinity, as compared to the simple polyamides, possess the potentialities of being very desirable for sheet and film-forming purposes. The four or more component polyamides are preferred over the three component polyamides for the purpose of this invention, as the three component polyamides in many respects more nearly resemble the two components or simple polyamides than the plasticizable resins which the four or more component polyamides more nearly resemble, although similar advantageous results may be achieved by the use of the three component polyamides in the practice of this invention.

While the four or more component polyamides have been formed into sheets and films which have a variety of utilities by reason of their increased pliability over the simple polyamides, and while these four or more component polyamides can be successfuly plasticized with certain aryl sulfonamides and certain N-alkyl arylsulfonamides to form sheets of increased pliability over the unplasticized four or more component polyamides, both the unplasticized polyamide and the sulfonamide plasticized compositions possess certain deficiencies which seriously restrict the utility of the films.

Among the disadvantages which plasticized and unplasticized multicomponent polyamides (by multicomponent polyamides is meant to include three component, four component and more than four component polyamides, but to exclude the simple or two component polyamide) have when compared with simple polyamides is increased moisture sensitivity. This moisture sensitivity is manifested by significant changes in the physical properties, such as flexibility of plasticized and unplasticized polyamide compositions on exposure to varying degrees of humidity.

Plastic compositions have found considerable utility in many fields of application due to the variety of properties that can be obtained through the proper formulation of plastic compositions. They have been used as flexible wire insulation or wire covering, flexible artificial or simulated leather, and rigid impact-resistant hammer heads.

While polyamide materials are preferred in the above mentioned applications, because of their greater strength and toughness over other types of plastic compositions, they do possess a decided disadvantage due to the fact that compositions of both unplasticized and plasticized multicomponent polyamides have high water sensitivity which produces changes in their physical properties, such as hardness and flexibility, as the atmospheric conditions, and in particular the humidity, surrounding them undergoes changes. Thus, as the relative humidity of the atmosphere surrounding the unplasticized or plasticized multicomponent polyamide increases, the flexibility increases, the hardness decreases, and the toughness decreases.

It is an object of this invention to provide novel compositions comprising ortho-sulfobenzimide and certain polyamide resins. A further object of this invention is to provide certain polyamide compositions which have increased resistance to the effects of changes in humidity, particularly polyamide compositions containing four or more component polyamide resins and also containing ortho-sulfobenzimide.

I have now discovered that certain polyamide compositions of decreased water or moisture sensitivity, or increased resistance to the effects of changes in humidity, may be prepared by incorporating therein ortho-sulfobenzimide.

The polyamides most suitable for incorporation into the novel compositions of this invention are those nylon-type multicomponent polyamide resins formed by the copolymerization, as described in U. S. Patent 2,252,554, of at least four different amide-forming reactants, at least one of which is a diprimary diamine and at least one other of which is a dicarboxylic acid or an amide-forming derivative of a dibasic carboxylic acid. The other two polyamide-forming reactants may be selected from diprimary diamines different from the first selected diprimary diamine, dicarboxylic acids or amide-forming derivatives of dibasic carboxylic acids different from the first selected dicarboxylic acid or amide-forming derivatives of a dibasic dicarboxylic acid, diamines having at least one hydrogen atom on each amino group, polymerizable monoamino carboxylic acids and amide-forming derivatives of monoamino carboxylic acids. For the purposes of describing the multicomponent polyamides suitable for the plasticized compositions of this invention, a salt of a diamine and a dibasic acid is considered as representing two polyamide-forming reactants. The amine and acid polyamide-forming reactants are used in substantially equal molecular amide-forming proportions. By substantially equal amide-forming proportions is meant that not more than 5 mol per cent excess of either amino or acid amide-forming functional groups are employed, that is, the reaction mixture must not contain substantially more than 5 mol per cent excess of either amino or acid amide-forming groups or their equivalents.

Polyamides formed by the condensation polymerization of more than four amide-forming reactants (in substantially equal molecular amide-forming proportions), have properties quite similar to those polyamides having four amide-forming components and, therefore, are equally suitable for incorporation into the plasticized polyamide compositions of this invention.

While the preferred polyamides for incorporation into the compositions of this invention are substantially the "four or more component interpolyamides" described in U. S. Patent No. 2,252,554, the so-called "three component interpolyamides" described in U. S. Patent Nos. 2,252,555 and 2,285,009, although not preferred, may also be used. The three component polyamide described in the latter two patents are those prepared by the condensation polymerization of two diprimary diamines and one dibasic carboxylic acid; one diprimary diamine and two dibasic carboxylic acids; or a diprimary diamine, a dibasic carboxylic acid and a polymerizable monoaminomonocarboxylic acid.

The preferred reactants for the preparation of the more suitable four or more component polyamides are diamines which may be represented by $H_2N-CH_2-R-CH_2-NH_2$ and dicarboxylic acids of the type $HOOC-R_1-COOH$ wherein R and $R_1$ represent polymethylene groups, suitably of 2 to 12 methylene groups and preferably of 4 to 8 methylene groups. However, R and $R_1$ in addition to being the preferred polymethylene groups, may be, in part, other substituted alkylene groups or aryl groups such as phenylene and substituted phenylenes.

The four component linear polyamides as described above are illustrated by such interpolymers as follows:

Hexamethylene adipamide-decamethylene sebacamide
Decamethylene sebacamide-heptamethylene pimelamide
Heptamethylene pimelamide-hexamethylene adipamide
Octamethylene suberamide-hexamethylene adipamide
Nonamethylene azelamide-hexamethylene adipamide
Nonamethylene azelamide-heptamethylene adipamide
Pentamethylene sebacamide-hexamethylene adipamide
Pentamethylene adipamide - decamethylene sebacamide
Pentamethylene pimelamide-hexamethylene sebacamide
Hexamethylene suberamide-decamethylene sebacamide
Hexamethylene suberamide-decamethylene adipamide The three component polyamides which are suitable for use in the preparation of the compositions of this invention are those linear polyamides which are produced by the condensation polymerization of three component amide-forming reaction mixtures which are illustrated as follows:

Hexamethylene diamine, adipic acid and sebacic acid
Decamethylene diamine, adipic acid and suberic acid
Hexamethylene diamine, pimelic acid and azelaic acid
Adipic acid, hexamethylene diamine and decamethylene diamine
Sebacic acid, pentamethylene diamine and hexamethylene diamine
Suberic acid, pentamethylene diamine and decamethylene diamine
6-amino caproic acid, hexamethylene diamine and sebacic acid
6-amino caproic acid pentamethylene diamine and pimelic acid In the above mentioned three component polyamides, the monoaminocarboxylic acids utilized may be represented by the formula

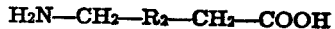
$$H_2N-CH_2-R_2-CH_2-COOH$$

wherein $R_2$ represents at least 3 and not more than 7 methylene groups.

The following procedures hereinafter described in detail are referred to in the examples wherein specimens are prepared and evaluated for their respective characteristics.

*Evaluation Procedure No. 1*

Plasticizers were incorporated into the polyamide resin through the use of a conventional 2" x 6" two-roll differential speed roll mill.

X grams of plasticizer were intimately mixed in a suitable beaker with 30.0—x grams of the polyamide resin, and 0.15 gram of sodium stearate which served as a mold release or lubricant. This mixture was then placed on a 2" x 6" two-roll differential speed roll mill wherein the temperature of the rolls were maintained approximately 15° C. above the melting point of the polyamide resin. The mixture was blended and compounded on the roll mill for 10 minutes after which time a homogeneous composition had been formed.

After this homogeneous composition had been formed, the rolls were cooled in such a manner that one roll was maintained 40-50° C. cooler than the other hotter roll. During this cooling period, the composition transferred entirely to the cooler roll. When the temperatures of the two rolls had reached 50° C. and 100° C., the polyamide composition was removed by applying a doctor blade to the roll containing the composition and removing the continuous sheet which had been formed.

In order to obtain a composition of uniform thickness suitable for subsequent physical testing, the polyamide composition prepared in the previously mentioned manner was placed in a 5" x 5" x 0.040" mold and placed in a steam heated hydraulic press under a pressure of 2,000 lbs. per square inch pressure and maintained under that pressure at a temperature of 325° F. for one minute after which time the press was cooled, the pressure released, and the uniformly molded polyamide composition removed.

*Evaluation Procedure No. 2*

In order to determine the effect of humidity changes on the physical properties of the polyamide compositions, the molded composition prepared according to Evaluation Procedure No. 1 was cut in half resulting in two specimens, each being 2.5" x 5" x 0.040". One half was conditioned in a conventional calcium chloride desiccator for 48 hours at 26° C. prior to testing. Under such conditions the sample can be said to have been subjected to a conditioning period of 48 hours at 26° C. and substantially 0% relative humidity. Hereinafter, samples that were conditioned according to the aforementioned method are referred to as "Dry" samples.

The second half of the specimen was conditioned by hanging in a constant temperature room for 7 days at 26° C. and 50% relative humidity. Hereinafter, samples that were subjected to such a conditioning period are referred to as "Wet" samples.

*Evaluation Procedure No. 3*

In order to determine the effect of humidity on the physical properties of polyamide compositions, the low temperature flexibility of both "wet" and "dry" samples was determined by the method described by Clash and Berg in Ind. Eng. Chem. 34, 1218 (1942). This method is well known to those skilled in the art and quite commonly used as a means of determining the relative flexibility characteristics of plastic compositions.

*Example I*

A composition composed of a four component polyamide resin, a hexamethylene adipamide-decamethylene sebacamide interpolymer prepared by the condensation polymerization of 41.2 parts by weight of hexamethylene diammonium adipate and 58.8 parts by weight of decamethylene diammonium sebacate and having a M. P. of 140° C., was prepared in the manner described under Procedure No. 1, and Procedure No. 2.

The low temperature flexibility of the "dry" sample was +28° C. while the low temperature flexibility of the "wet" sample was +1° C. as determined according to Procedure No. 3.

*Example II*

A composition of a plasticized four component polyamide resin was prepared according to Procedures Nos. 1 and 2 containing as a plasticizer 25% by weight of total composition of the resinous condensation product of o,p-toluenesulfonamide and formaldehyde. The polyamide resin was a four component polyamide resin, a hexamethylene adipamide-decamethylene sebacamide interpolymer prepared by the condensation polymerization of 41.2 parts by weight of hexamethylene diammonium-adipate and 58.8 parts by weight of decamethylene diammonium-sebacate and having a M. P. of 140° C.

The low temperature flexibility of the "dry" sample was +27° C. while the low temperature flexibility of the "wet" sample was +7° C. as determined according to Procedure No. 3.

*Example III*

A composition of plasticized polyamide resin was prepared according to Procedures Nos. 1 and 2, utilizing the same polyamide resin of Example II and containing 10% by weight of total composition of N-ethyl o,p-toluenesulfonamide as a plasticizer.

The low temperature flexibility of the "dry" sample was +14° C. while the low temperature flexibility of the "wet" sample was −3° C. as determined according to Procedure No. 3.

Examples I, II, and III illustrate the effect of humidity on unplasticized four component polyamide resins and on four component polyamide resins plasticized with the commonly used plasticizers such as the resinous condensation product of o,p-toluenesulfonamide and formaldehyde and N-ethyl o,p-toluenesulfonamide. All compositions exhibited significantly different flexibilities on exposure to different relative humidities. The ease with which this change in flexibility takes place is clearly shown by the fact that the flexibility of each of the aforementioned "wet" samples can be decreased to the flexibility of its corresponding "dry" sample by placing the "wet" sample in a conventional calcium chloride desiccator for 24 hours at 26° C.

This deleterious response to humidity changes is not to be desired as articles fabricated from such compositions are subject to significant changes in properties and performance characteristics upon mere changes of atmospheric conditions and as such prohibits an accurate determination of the suitability of such compositions for many applications.

*Example IV*

A composition of a plasticized polyamide resin was prepared according to Procedures Nos. 1 and 2, utilizing the same polyamide resin of Example II and containing 25% by weight of total composition of o-sulfobenzimide as a plasticizer.

The low temperature flexibility of the "dry" sample was +7° C. while the low temperature flexibility of the "wet" sample was also +7° C. as determined according to Procedure No. 3.

*Example V*

A composition of a plasticized polyamide resin was prepared according to Procedures Nos. 1 and 2, utilizing the same polyamide resin of Example II and containing 15% by weight of total composition of o-sulfobenzimide as a plasticizer.

The low temperature flexibility of the "dry" sample was +10° C. while the low temperature flexibility of the "wet" sample was also +10° C. as determined according to Procedure No. 3.

Example VI

A composition of a plasticized polyamide resin was prepared according to Procedures Nos. 1 and 2 utilizing the same polyamide resin of Example II and containing 10% by weight of total composition of o-sulfobenzimide as a plasticizer.

The low temperature flexibility of the "dry" sample was +14° C. while the low temperature flexibility of the "wet" sample was also +14° C. as determined according to Procedure No. 3.

Example VII

A composition of a plasticized polyamide resin was prepared according to Procedures Nos. 1 and 2 utilizing the same polyamide resin of Example II and containing 5% by weight of total composition of o-sulfobenzimide as a plasticizer.

The low temperature flexibility of the "dry" sample was +20° C. while the low temperature flexibility of the "wet" sample was also +20° C. as determined according to Procedure No. 3.

Examples IV, V, VI and VII illustrate the resistance of the novel compositions of this invention to changes in physical properties on exposure to changes in atmospheric conditions. In every case the low temperature flexibility of both the "wet" and "dry" samples was the same. Thus the compositions of this invention will exhibit substantially unvarying properties regardless of atmospheric conditions and permit more widespread utility of such compositions.

I claim:

1. A polyamide composition comprising orthosulfobenzimide and a polyamide resin, the orthosulfobenzimide being present in an amount equal to 5 to 25% of the weight of the total composition and such polyamide resin being selected from the group consisting of (A) polyamide resins formed by the condensation polymerization of 3 different complementary amide-forming reactants selected from the group consisting of (a) diprimary diamines of the type

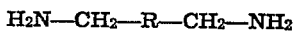
$H_2N—CH_2—R—CH_2—NH_2$ wherein R represents at least 4 and not more than 8 methylene groups (b) dicarboxylic acids of the type $HOOC—R_1—COOH$ wherein $R_1$ represents at least 4 and not more than 8 methylene groups, (B) polyamide resins formed by the condensation polymerization of a diprimary diamine of the type

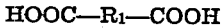
$H_2N—CH_2—R—CH_2—NH_2$ wherein R represents at least 4 and not more than 8 methylene groups, a dicarboxylic acid of the type $HOOC—R_1—COOH$ wherein $R_1$ represents at least 4 and not more than 8 methylene groups and a monoaminocarboxylic acid of the type

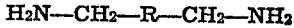
$H_2N—CH_2—R_2—CH_2—COOH$ wherein $R_2$ represents at least 3 and not more than 7 methylene groups, and (C) polyamide resins formed by the condensation polymerization of at least 4 different amide-forming reactants of which at least 2 are diprimary diamines of the type

$H_2N—CH_2—R—CH_2—NH_2$ wherein R represents at least 4 and not more than 8 methylene groups and at least 2 different complementary amide-forming reactants selected from the class consisting of (a) dicarboxylic acids of the type $HOOC—R_1—COOH$ wherein $R_1$ represents at least 4 and not more than 8 methylene groups and (b) amide-forming derivatives of said type of carboxylic acids.

2. A polyamide composition comprising orthosulfobenzimide and a polyamide resin, the orthosulfobenzimide being present in an amount equal to 5 to 25% of the weight of the total composition and such polyamide resin being formed by the condensation polymerization of at least 4 different amide-forming reactants of which at least 2 are diprimary diamines of the type

$H_2N—CH_2—R—CH_2—NH_2$ wherein R represents at least 4 and not more than 8 methylene groups and at least 2 different complementary amide-forming reactants selected from the class consisting of (a) dicarboxylic acids of the type $HOOC—R_1—COOH$ wherein $R_1$ represents at least 4 and not more than 8 methylene groups and (b) amide-forming derivatives of said type of carboxylic acids.

3. A polyamide composition comprising orthosulfobenzimide and a polyamide resin, the orthosulfobenzimide being present in an amount equal to 5 to 25% of the weight of the total composition and such polyamide resin being formed by the condensation polymerization of 3 different complementary amide-forming reactants selected from the group consisting of (a) diprimary diamines of the type

$H_2N—CH_2—R—CH_2—NH_2$ wherein R represents at least 4 and not more than 8 methylene groups (b) dicarboxylic acids of the type $HOOC—R_1—COOH$ wherein $R_1$ represents at least 4 and not more than 8 methylene groups.

4. A polyamide composition comprising orthosulfobenzimide and a polyamide resin, the orthosulfobenzimide being present in an amount equal to 5 to 25% of the weight of the total composition and such polyamide resin being formed by the condensation polymerization of hexamethylene diamine, decamethylene diamine, adipic acid and sebacic acid.

5. A polyamide composition comprising orthosulfobenzimide and a polyamide resin, the orthosulfobenzimide being present in an amount equal to 5 to 25% of the weight of the total composition and such polyamide resin being formed by the condensation polymerization of hexamethylene diamine, adipic acid and sebacic acid.

RUSSELL H. SCHLATTMAN.

No references cited.